United States Patent [19]

Dolan

[11] 4,311,170

[45] Jan. 19, 1982

[54] FLUID FLOWMETER VALVE

[75] Inventor: Stephen J. Dolan, Bellerose, N.Y.

[73] Assignee: Precision Metering, Inc., Bellerose, N.Y.

[21] Appl. No.: 155,441

[22] Filed: Jun. 2, 1980

[51] Int. Cl.³ .......................... F16K 3/26; F16K 47/04
[52] U.S. Cl. .............................. 137/614.17; 251/121; 251/122
[58] Field of Search ................... 137/614.17; 251/121, 251/122

[56] References Cited

U.S. PATENT DOCUMENTS 4,064,908 12/1977 Loe ............................... 137/614.17

*Primary Examiner*—Arnold Rosenthal
*Attorney, Agent, or Firm*—Scully, Scott, Murphy & Presser

[57] ABSTRACT

A combination needle type flow control and shut-off valve having a bore completely passing through the body of the valve. The body of the valve has inlet and outlet ports. A sleeve is slidably sealed and received within the bore, and contains a threadedly received needle type flow control. The sleeve further has two planar arrays of radial bores which connect the inlet and outlet ports of the body through the sleeve. The sleeve can then be pushed or pulled or either open or close the fluid flow through the control valve.

3 Claims, 2 Drawing Figures

FLUID FLOWMETER VALVE

BACKGROUND OF THE INVENTION

1. Field of the Invention

The present invention relates generally to fluid flowmeter valves and, more particularly, pertains to a novel push-pull type flowmeter valve which has the capability of maintaining a precise fluid flow control setting irrespective of the on-off position of the valve.

Needle control type valves are well known in the art of precision fluid flowmeter instruments. In gas and liquid chromatography, control valves having a needle flow control are utilized to serve several functions. First, the needle control element is precision machined so as to enable an operator to precisely control the amount of fluid flowing through the valve. Secondly, the needle control element is also utilized to prevent any flow of fluid through the valve by setting the needle to its fully closed position.

2. Discussion of the Prior Art

A type of flowmeter valve which is common in the prior art is illustrated in CHEMETRON Corporation's advertising brochure for flowmeters, dated December 1978. This brochure discloses a typical dual function needle control valve, and illustrates the basic parts and operation thereof. The valve is shown partially in cross-section, demonstrating a function wherein the turning of a control knob forces a needle control element into the fluid passageway within the valve and produces a smaller orifice through which the fluid may flow. Through continued turning of the control knob, the needle then fulfills its second function in abutting against the tapered orifice wall of the valve sleeve to effectively prevent fluid flow through the valve.

The problems associated with a dual function needle control valve of this type are numerous. Specifically, the configuration utilized to allow needle control type shut-off greatly decreases the operating life of the internal mechanical valve components. The precision machined edges of the needle control element readily become worn and unusable over a relatively short operating life span due to the repeated abutment of the needle against the edges of the valve sleeve, thereby resulting in a needle control having a restricted fine-setting capability. The effective operational life of the abutting wall of the valve sleeve is also decreased by the constant abutting action against the tapered needle, thereby also resulting in a needle valve control arrangement having a further reduced operating life. This loss of function necessitates frequent replacement of the needle and, if the abutment wall is also damaged or worn then, additionally, the entire valve sleeve must also be serviced or replaced.

Another major problem associated with needle shutoff valves of this type is the lack of control the original operator has over subsequent flow settings. Specifically, fluid flow control arrangements are often used in hospitals wherein both skilled and unskilled workers perform their daily work duties which, of course, include tending to the patients. After initially setting a flowmeter for a particular patient, it often becomes necessary, either for treatment or otherwise, to later temporarily turn off the flowmeter. Frequently, this turning off and resetting is not carried out by the original operator of the flowmeter, but by other personnel. Because of its dual function, after the needle flow control has been turned to its fully closed setting, the patient must then rely upon the accuracy of the new operator's memory to restore the flowmeter to its original setting. Unfortunately, the memory of the later operator is not always adequate to provide proper service and care to the patient. This may result in a patient receiving an overdose or underdose of a required fluid, with resultant dangerous or even tragic consequences to the patient.

The arrangements in the prior art which have sought to overcome the aforementioned problems have relatively complicated configurations and commensurately increased machining costs, and as a consequence thereof have achieved only limited success.

The invention herein described is drawn to a relatively inexpensive yet completely effective solution to the aforementioned problems. Although Loe U.S. Patent 4,064,908 is considered to be relevant prior art, the present invention uses a novel, simple design to accomplish what Loe seeks to achieve through a highly complicated mechanism.

In greater particularity, Loe discloses a valve designed with the on-off function of the valve being independent of and not controlled by the needle flow control. This is accomplished in Loe by providing a valve cartridge which is threadedly received within a bore in the valve body. An operator, seeking to turn the valve off, must turn the knob which rotates the cartridge and results in longitudinal movement thereof into its innermost position to shut off the fluid flow. This knob can then be turned in the opposite direction to rotate the cartridge out of the bore to allow fluid flow therethrough. The actual shut off mechanism involved is the abutment of the valve cartridge and the end "O" ring against an inwardly tapered wall. This abutment operation occurs in much the same manner as found in the previously discussed prior art. A needle-type metering valve is threadedly engaged in the cartridge which is carried within the sleeve. The only function of the needle control element is to meter the fluid flow within the cartridge, independent of the on-off function of the valve. In addition to the abutment and the specially threaded cartridge received by the bore of the valve, Loe further states that this threaded assembly is absolutely required because of the mechanical advantage it provides. The patient also states that in order to withstand the flow pressures involved within the valve, an elaborate, balanced, seal arrangement would be required without this mechanical advantage. Loe further discloses that if a push-pull type construction were utilized, additional O ring seals would be required to achieve a required balanced seal. Loe, however, presents a complicated answer to the aforementioned problems. Specifically, Loe requires two threadedly received parts, the cartridge and the needle control element. Also, the cartridge still uses an abutting operation as clearly taught in the prior art. This abutment of O rings leads to a shorter operating life of the valve as well as a more complicated configuration.

The invention described herein attains the advantages of an independent needle flow control, and also provides a valve which is more efficient and more economical to maintain and manufacture than the Loe valve. Contrary to the disclosure in the Loe patent, the invention incorporates a needle flow control valve with a push-pull type shutoff valve. The present invention provides a push-pull type shutoff valve which is relatively easy to use without requiring any mechanical advantages as it taught by Loe. Specifically, the present invention discloses a simple yet remarkably effective flowmeter valve with a precision needle control independent of the shutoff mechanism of the valve which has a simple configuration of O rings to provide effective seals between a bore and a valve sleeve, as well as a unique arrangement of planar array radial bores.

This simple configuration completely circumvents any need for a mechanical advantage because of the inherent balance in the design of the valve. Further, the present invention does not require additional machining or a cartridge type of configuration. This provides an inexpensive valve with an extended operating life because there is no internal abutting of any relatively movable parts, thereby providing a valve which has negligible wear and therefore a much longer operating life.

Additionally, Brown U.S. Pat. No. 3,707,994 and Landwehr U.S. Pat. No. 3,870,080 although not considered highly relevant, are included to show the general state of the related art. Brown, U.S. Pat. No. 3,707,994 provides a spring loaded device which is used to regulate the flow of air to pneumatic tools. Although Brown discloses an apparatus which utilizes a sliding mechanism, the apparatus does not have a needle valve control, but rather uses a trigger to both shut off the flow as well as to meter it. Landwehr U.S. Pat. No. 3,870,080 discloses a valve which is capable of metering the flow and temperature of water in a faucet. A cartridge in the valve controls the water temperature by axial displacement and controls the flow therethrough by rotational movement. The invention herein described has the advantage over this art by not being dependent on any rotational orientation, thereby allowing operators of the present invention to be able to more easily operate the valve herein described.

SUMMARY OF THE INVENTION

Accordingly, it is a primary objective of the present invention to provide an improved push-pull type of shut off mechanism for fluid flowmeters which is relatively inexpensive to manufacture and which has utility particularly in conjunction with chromatographs, flowmeters, and respiratory equipment.

Another object of the present invention is the provision of a valve which is relatively maintenance free and can withstand many hours of extended use with only negligible wear on any of its parts.

A further object of the present invention is to provide a needle control which can be operated only by designated personnel and wherein subsequent operators do not need to adjust the needle flow control setting.

The present invention provides a novel apparatus incorporating therein a precision needle control function which is independent of the on-off function of the valve, and which has a configuration which is relatively maintenance free and inexpensive to assemble and maintain.

BRIEF DESCRIPTION OF THE DRAWINGS

The foregoing and other objects, advantages and characterizing features of the present shut-off valve will become more clearly apparent from the ensuing detailed description of an illustrative embodiment thereof, taken in conjunction with the accompnaying drawings wherein identical reference numerals denote like parts throughout the various views, and in which.

DESCRIPTION OF THE PREFERRED EMBODIMENTS

Figure 1:
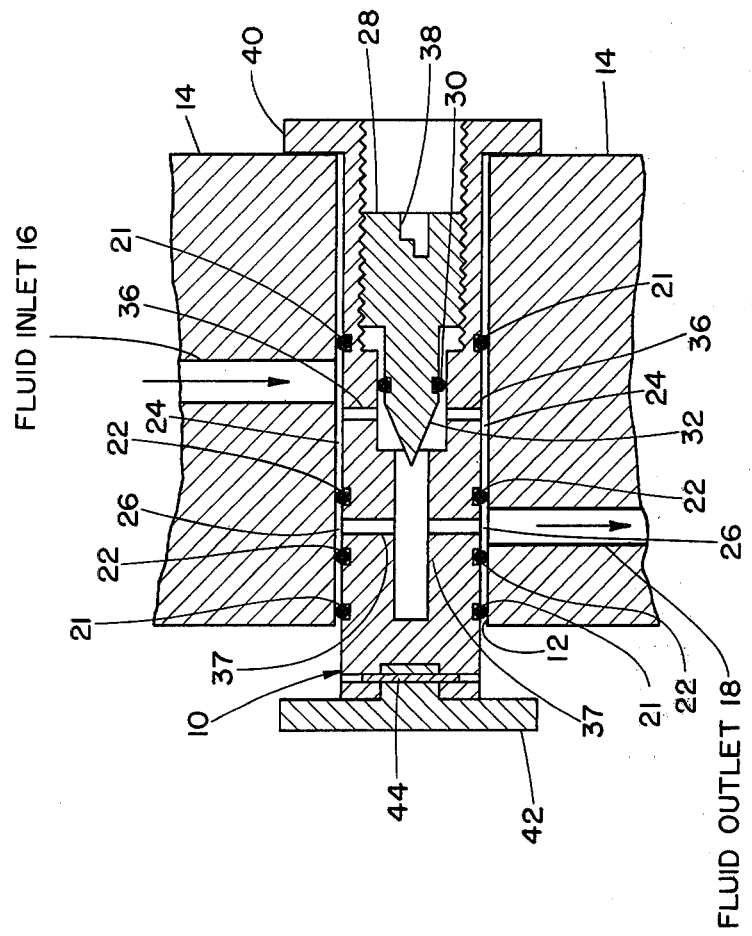
FIG. 1 is a longitudinal sectional view of the valve assembly with both the needle control element and push-pull shut off valve in an open position.
Figure 2:
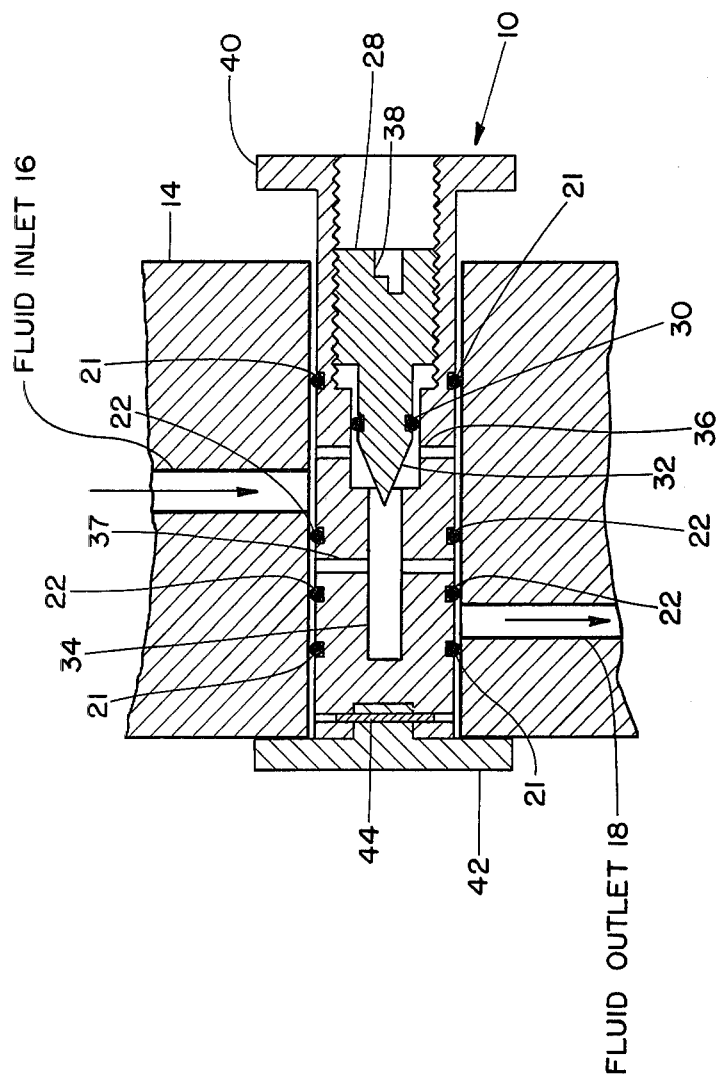
FIG. 2 is a longitudinal sectional view of the assembly with the needle control element open and the push-pull shut off valve in a closed position.

Referring now to the drawings in detail, there is shown in FIGS. 1 and 2 a sleeve 10 slidably received within a bore 12 of a valve body 14. Valve body 14 has a fluid inlet port 16 which connects a supply of fluid to the valve and a fluid outlet port 18 through which a metered flow rate may be maintained. A plurality of O rings 21, 22 are provided around the circumference of sleeve 10 at spaced positions therealong to slidably seal the sleeve 10 relative to the bore 12 of the valve body 14. The O rings 21, 22 also partition the space between the sleeve 10 and valve body 14 into an annular inlet chamber 24 and an annular outlet chamber 26 which communicate, respectively, with the inlet and outlet ports 16 and 18 when the valve is in an open position. Further, O rings 21 effectively seal the sleeve 10 relative to the bore 12 regardless of the position of the sleeve, and seal against any escape of fluid whether the sleeve 10 is in an open, closed or intermediate position. A needle valve control element 28 is threadedly engaged within the sleeve 10 at one end thereof. An O ring 30 is provided extending around the circumference of the needle valve element 28 to seal the tapered needle portion 32 thereof within a metering chamber 34 defined within the interior of sleeve 10. This chamber and seal arrangement allows the tapered needle portion 32 to control the flow of fluid through the metering chamber 34. Two planar arrays of radial bores 36, 37 are provided to facilitate a flow of fluid from the inlet chamber 24 to the metering chamber 34, and then past the needle control element to the outlet chamber 26. The needle valve control 28 is provided with a keyed face 38 at the threaded end of the valve sleeve 10 in order to effectively prevent anyone without a key from changing the flow setting of the needle valve. Further, an integrally formed end flange 40 at one end of sleeve 10 has a larger diameter than that of the bore 12, thereby preventing the sleeve 10 from sliding completely through the bore 12 in a direction to the left as shown in the drawings. A second end flange 42 is fitted onto the sleeve 10 at the opposite end thereof and fastened to the sleeve by a pin 44, as shown clearly in FIG. 1, thereby preventing the sleeve 10 from sliding completely through the bore in an opposite direction.

In operation, in an open position, as shown in FIG. 1, fluid travels through inlet port 16 of the valve into inlet chamber 24. The fluid then flows through the first array of radial bores 36 into the metering chamber 34. The needle valve control 28 is threadedly set to allow a desired fluid flow past the tapered needle 32, and then through the second array of radial bores 37 into the fluid outlet chamber 26. The fluid then flows through the fluid outlet port 18 to its controlled operation, such as to a medical patient. The O rings 21, 22 are provided to seal the sleeve 10 relative to the valve body 14, and also serve to define the inlet and outlet chambers 24 and 26, respectively.

In a closed position of the control valve, as shown in FIG. 2, the valve sleeve 10 is moved to the right, as by an operator of the valve. This action is easily effectuated by hand, or alternatively may be controlled by a solenoid or similar servo control. Note also, that rotation of the sleeve 10 within bore 12 does not in any manner affect the flow of liquid through the control valve. After translational movement of the sleeve to the right, fluid flow is effectively prevented between the fluid outlet chamber 26 and the outlet port 18, thereby closing the valve while not disturbing or altering the fluid flow setting of the tapered needle valve element. Additionally, in the closed position of the control valve, the inlet and outlet chambers are at a pressurized equilibrium, thereby effectively preventing any movement of the sleeve 10 within bore 12 which might possibly be caused by fluid flow or a pressure differential.

From the foregoing it is apparent that the objects of the present invention have been fully accomplished. As a result of the present invention, a new push-pull type of valve for flowmeters and chromatographs has been provided. Although a preferred embodiment of the principles of this invention has been described and illustrated in detail herein, it should be realized that the same are not limited to the particular configuration shown in the drawings, and that modifications thereof are contemplated and can be made without departing from the broad spirit and scope of this invention as defined in the appended claims.

What is claimed is:

1. A combination needle flow control and shutoff valve for precision instruments comprising a body having a bore formed therein, fluid inlet and outlets ports communicating transversely with said bore, a sleeve slidably positioned within said bore for linear movement along the longitudinal axis of said bore, said sleeve being slidably movable in said bore between a first position in which the valve is open to allow fluid communication between said fluid inlet and outlet ports and a second position in which the valve is closed to prevent fluid communication between said fluid inlet and outlet ports, said sleeve having a metering chamber for regulating the flow of fluid through the valve, and a needle control valve threadedly engaged to said sleeve and extending into said metering chamber to precisely regulate fluid flow therethrough when the sleeve is in said first position; said sleeve having a plurality of O rings positioned therearound and spaced along its length for sealing the sleeve relative to the bore and forming a fluid inlet chamber between a first pair of said O rings and a fluid outlet chamber between a second pair of said O rings; said valve including at least one first radial bore in said sleeve connecting said fluid inlet chamber to said metering chamber and at least one second radial bore connecting said fluid outlet chamber to said metering chamber; said bore completely extending through said body, said sleeve extending completely through said bore and having an end flange arranged at each end thereof, the flanges adapted to be gripped so as to enable said sleeve to be axially moved within said bore, said flanges defining the extreme end positions of said sleeve relative to said bore.

2. A combination needle flow control and shut-off valve as described in claim 1, wherein said first and second radial bores are axially spaced along said sleeve at a distance less than the axial distance between said inlet and outlet ports.

3. A combination needle flow control and shut-off valve as described in claim 1, wherein the two inner O rings are positioned along the slidably positioned sleeve a distance less than the distance between said inlet and said outlet ports.

* * * * *